Jan. 12, 1926.
W. T. IRVIN
1,569,755
HEAT INSULATING MATERIAL AND PROCESS OF MAKING MOLDED BODIES THEREOF
Filed Dec. 24, 1924
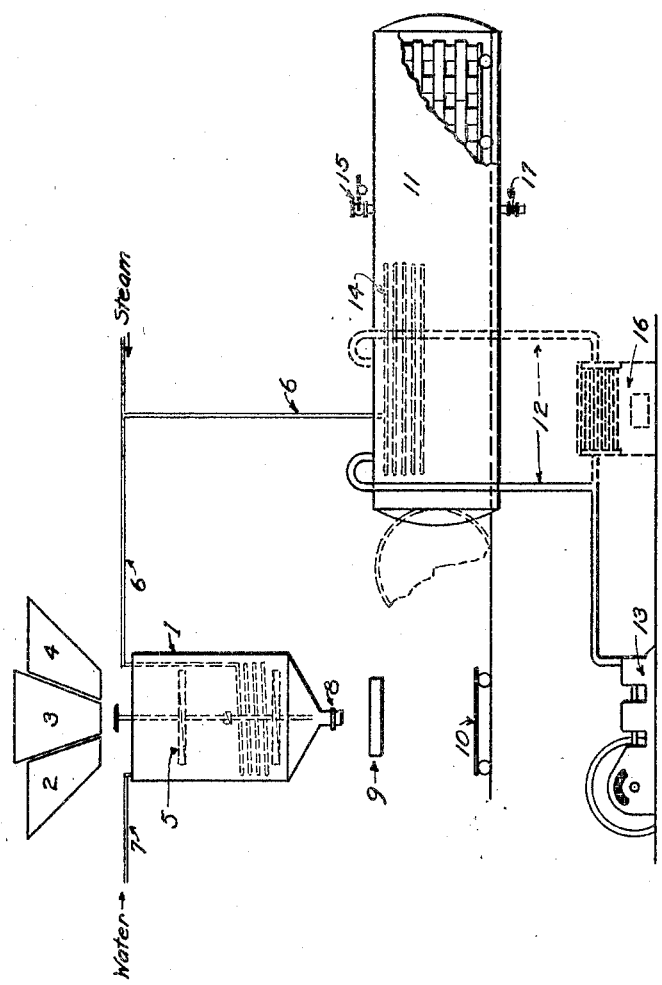
INVENTOR.
WEBB T. IRVIN
BY
ATTORNEY.

Patented Jan. 12, 1926.

1,569,755

UNITED STATES PATENT OFFICE.

WEBB T. IRVIN, OF LOMPOC, CALIFORNIA, ASSIGNOR TO THE CELITE COMPANY, OF LOS ANGELES, CALIFORNIA, A CORPORATION OF DELAWARE.

HEAT-INSULATING MATERIAL AND PROCESS OF MAKING MOLDED BODIES THEREOF.

Application filed December 24, 1924. Serial No. 757,844.

*To all whom it may concern:*

Be it known that I, WEBB T. IRVIN, a citizen of the United States, residing at Lompoc, county of Santa Barbara, State of California, have invented an Improvement in Heat-Insulating Materials and Processes of Making Molded Bodies Thereof, of which the following is a specification.

This invention pertains to a strong, light, heat insulating material and a method of making same in molded form by a mode of operation which is notably simple and economical.

The object of the invention is to produce a heat insulating block or molded body free from shrinkage or disintegration at high temperatures, and having a relatively high strength, and high heat insulating efficiency, and to disclose a manufacturing operation during which the loss through breakage and malformation is reduced to a minimum. A further object of the invention is to disclose a process of manufacture in which two ordinarily distinct operations, namely, hardening and drying, are combined in one distinct and new step of the process, thereby reducing the time in process as well as the handling and labor costs.

Broadly expressed, my invention comprises the formation of a slurry or workable mass of diatomaceous earth, an alkaline earth and a fibrous material in water, pouring such mixture into suitable molds, and then exposing the molded bodies to a hardening and drying operation in a closed, heated chamber by means of a large volume of air at such pressure as to prevent boiling of the freshly molded body within the chamber.

The materials used by me in the composition of the block produced by the operation of my invention are well known. For example, Brown was granted U. S. Patent 311,287 in 1885 for a plastic non-conducting composition composed of diatomaceous earth, lime and asbestos. I have found that these materials if properly combined result in a very porous body having a high heat insulating value. I may utilize diatomaceous earth, ground quicklime and a fibrous material, and by mixing these ingredients with sufficient water to form a workable slurry, blocks or other shapes may be molded and then hardened and dried so as to produce a coherent, strong body, of light weight and therefore of a low thermal conductivity.

It has been well known that silica and lime in the presence of steam at a pressure of 150 pounds will combine to form a hydrated calcium silicate, resulting in a hard horny mass having a high crushing strength. This method has been used to a considerable extent in the manufacture of sand lime brick and necessitates the use of large quantities of steam. If lime and silica are left in contact in the presence of water for a considerable length of time and the water is slowly removed as by natural evaporation, a solid body will also form but only very little, if any, hydrated calcium silicate is formed, the bond being supplied through the lime alone. The latter method of drying results in a weak molded product of much lower strength, and shrinkage, cracking and deformation is very noticeable.

My invention obviates and renders unnecessary the use of large quantities of steam, as described above, for the production of hydrated calcium silicate, and at the same time prevents the shrinkage, cracking and deformation which is characteristic of the products made by drying a molded body slowly. Moreover, blocks produced by the treatment of a lime, silica, water mixture under steam pressure require that at the end of the hardening operation, the steam pressure is reduced slowly so as to prevent cracking and disintegration of the blocks, and the blocks obtained have a high water content (having been bathed in steam) so that a separate and subsequent drying operation is necessary. In accordance with my invention, the hardening and drying operations are simultaneously performed and in shorter total time than that required for the hardening operation alone when steam under pressure is used.

The accompanying drawing illustrates an apparatus suitable for carrying out my invention in its perfected form. The apparatus shown comprises an agitating tank (1) to which the materials used, i. e. lime, fibre and diatomaceous earth, are supplied by scroll feeders or other suitable means from bins (2) (3) and (4). The agitating tank (1) is equipped with a mechanical stirrer or agitator of suitable design (5) and a means of supplying steam (6) and water (7) thereto. The agitating tank discharges its contents through suitable exit means (8) to molds (9) which are then arranged on cars (10) and sent into a pressure chamber (11).

The pressure chamber (11) has tightly fitting doors at either end and may be built in a manner similar to that used in the construction of autoclaves for the manufacture of sand lime brick and has means (12) of admitting compressed air supplied from a compressor of any suitable design (13) or other source. The pressure chamber is also equipped with closed steam coils (14) of sufficient size to maintain a temperature such as is needed to carry out my invention or with other adequate means of heating, such as a steam jacket around chamber, and with safety valve (15) which may be adjusted for any desired pressure. As a modification of the above apparatus the compressed air from compressor (13) may be sent through an adequate heater (16), for example a heater comprised of a multiplicity of pipes through which the air passes, such pipes being heated externally by means of gases of combustion, and the heated compressed air may then be admitted into the pressure chamber (11).

In the operation of my invention water is fed into tank (1) and diatomaceous earth in the required proportion fed therein from bin (4). Steam may be admitted when desirable into closed coils from (6) and the suspension of diatomaceous earth in water heated up to any desired degree. Ground quick-lime is then added to the suspension from bin (2) and the mixture thoroughly agitated, some fibre such as asbestos being added from bin (3) during such agitation if desired. After a homogeneous mass or slurry is obtained the mixture is allowed to flow into molds (9), such molds being set upon cars (10) which are then driven into the pressure chamber (11).

After pressure chamber (11) has been filled with molds containing the slurry of diatomaceous earth, lime and fibre, the doors are closed, steam is admitted into the coils (14) and compressed air is forced into pressure chamber. Safety valve (15) is set at any pressure at which it is desired to operate, say from 25 to 100 pounds. For example when operating at a steam coil temperature of 160° F. the pressure may be set at any super-atmospheric pressure, say 50 pounds, but in all cases the pressure should be in excess of that at which boiling would occur in the freshly molded product contained in the pressure chamber. The safety valve can be placed on the lower side or bottom of the pressure chamber so as to allow the water vapors to be removed, but a quick acting valve (17) may be provided for this purpose.

The blocks are retained in the pressure chamber under a continued predetermined pressure, fresh air being constantly supplied and discharged through safety valve (15), for such length of time as it may be found necessary to produce hard and substantially dry blocks. This will vary from 20 to 60 hours depending upon the composition used and the temperature and pressure existing in the pressure chamber. During the passage of the large quantities of air under pressure through pressure chamber (11) the blocks or molded bodies will harden and become rigid, the lime combining with the silica of the diatomaceous earth to form a calcium silicate, and the water will be mechanically removed in the form of vapor but without the production of steam, as the temperature in the interior of the pressure chamber should at no time be high enough to produce steam under the pressure existing in the chamber as regulated by the safety valve (15), and the volume of air passed through said pressure chamber.

Under certain manufacturing conditions it has been found desirable not to dry the blocks entirely in the pressure chamber, but take them out while some moisture remains and then dry completely either in the air or in heated dryers. In all instances, however, the blocks are set or hardened and over 50% of the moisture removed before they are taken out of the pressure chamber.

The diatomaceous earth, also known as kieselguhr, fossil flour, infusorial earth or tripoli, used in my invention may be finely divided raw diatomaceous earth or it may be calcined or otherwise treated before use in my composition; powdered diatomaceous earth which has been calcined with salts of alkali forming metals gives a stronger block than the raw diatomaceous earth. Ordinary quicklime, preferably ground before intermixture with the other ingredients, is generally used, although hydrated lime may also be utilized. Magnesite, caustic magnesia or barytes, and other forms of alkaline earths may be used, although magnesia does not produce blocks of the strength obtained when lime is used. Asbestos fibre is the preferred fibrous material; hemp, hair or other fibres of similar nature may be used wherever the finished blocks are not to be exposed to high temperatures while in use.

When lime is used as the binder, the amount of quick-lime used may vary from 10 to 45% by weight and the diatomaceous earth from 10 to 90%. The use of a fibrous material is optional, and the amount may vary up to 30% by weight. By varying the constituents entering into the composition used, the weight and strength of the finished product may be varied within rather wide limits. Blocks ranging in density from 12 to 28 pounds per cubic foot have been produced by the process described in this specification.

The following data is an actual illustration of the entire process. The agitating tank was filled with a predetermined amount of water and 65% finely divided diatomaceous earth, 25% ground quicklime and 10% asbestos fibre by weight added thereto. The ratio between solids and water by weight was about 1 to 8. These ingredients were then thoroughly agitated until a homogeneous slurry was formed, which was then poured into molds. The molds were then placed in a pressure chamber and the chamber doors closed. The pressure chamber was heated by means of closed steam coils so that a temperature of 200° F. was maintained during the run. Compressed air at 70 pounds per square inch was passed into and through the pressure chamber for a period of 32 hours. The safety valve was set to pop off at 70 pounds and was located in the bottom of the pressure chamber so as to allow all water to drain or be blown out. At the end of 32 hours the pressure was released and the blocks removed. They were white, dry and weighed only 21 pounds per cubic foot.

It shall be understood that the molded bodies made in accordance with my invention described in this specification may, after removal from the pressure chamber, be sawed, planed, trimmed, painted or otherwise treated in order to become adapted for use in smaller or specially shaped units. For example, canvas may be applied either to one or all surfaces.

What I claim is:

1. In the process of making molded heat insulating bodies comprising diatomaceous earth and an alkaline earth, a molding operation and a combined hardening and drying operation comprising exposure of the molded bodies to large volumes of air under pressure.

2. In the process of making molded heat insulating bodies comprising diatomaceous earth and an alkaline earth, a molding operation and a combined hardening and drying operation comprising exposure of the molded bodies to large volumes of heated air under pressure.

3. The process of making molded heat insulating bodies comprising a molding operation, and then subjecting the molded bodies to a combined hardening and drying operation by exposure to large volumes of heated air at a pressure sufficient to prevent ebullition.

4. In the process of making molded heat insulating bodies containing diatomaceous earth and alkaline earth, a molding operation, and a combined hardening and drying operation comprising exposure of the molded bodies to large volumes of heated air at a pressure prohibitive to the formation of steam.

5. In the process of making heat insulating bodies comprising diatomaceous earth, lime and a fibrous material; formation of a plastic mass by mixing the ingredients with water; molding the material so produced to desired shape; and exposing such molded bodies to large volumes of heated air at a pressure and temperature prohibitive to boiling of water in the molded shapes.

6. Heat insulating bodies comprising diatomaceous earth and alkaline earth produced by a molding operation and exposure of the molded bodies to large volumes of heated air at a pressure sufficient to prevent ebullition.

7. Heat insulating bodies comprising diatomaceous earth and lime, produced by a molding operation and subsequent exposure of the molded bodies to large volumes of heated air at a pressure sufficient to prevent ebullition.

8. Heat insulating bodies comprising 65% diatomaceous earth, 25% lime and 10% fibrous material, produced by mixing the ingredients with water, molding to shape and subsequently exposing such molded bodies to a large volume of heated air at a pressure sufficient to prevent ebullition.

9. The herein described process of making heat insulating bodies consisting in mixing diatomaceous earth and alkaline earth and water; molding the mixture, and then subjecting the molded mixture to the action of a large volume of heated air under such pressure as will prevent boiling or ebullition of water in the molded mixture until the mass is set, hardened and substantially dried.

10. The herein described process of making heat insulating bodies consisting in mixing diatomaceous earth, an alkaline earth and a binder with water to form a homogeneous slurry; molding the mixture; and then subjecting the molded mixtures in a closed chamber to the action of a large volume of heated air under such pressure as will prevent boiling or ebullition of water in the molded mixture until the mass is set, hardened and substantially dried.

11. The herein described process of making heat insulating bodies consisting in making a fluid mixture of diatomaceous earth, and alkaline earth; molding the mixture; then introducing the molded mixture into a closed chamber and subjecting same in such chamber to the action of a large volume of heated air under such pressure as will prevent boiling or ebullition of the water in the molded mixture until the mass is set, hardened and substantially dried.

12. The herein described process of making heat insulating bodies consisting in mixing diatomaceous earth, an alkaline earth, and a binder with water to form a homogeneous slurry; then pouring the mixture into molds, then placing the mold containing the mixture in a closed chamber and subjecting same in such chamber to the action of large volumes of heated air under such pressure as will prevent boiling or ebullition of the water in the molded mixture and continuing this treatment until the mass is set, hardened and dried.

13. Heat insulating bodies comprising diatomaceous earth, a binder, and fibrous material; produced by a molding operation and subsequent exposure of the molded bodies to large volumes of heated air under such pressure as will prevent boiling or ebullition of water in the molded bodies until said bodies are set, hardened, and substantially dried.

14. A heat insulating body, comprising diatomaceous earth, an alkaline earth, and a fibrous material; produced by mixing and molding such ingredients, and subjecting the molded bodies to large volumes of heated air under such pressure as will prevent boiling or ebullition of water in the molded bodies, until such bodies are set, hardened, and substantially dried.

15. The herein described process of making molded bodies, consisting in molding a plastic mass and then subjecting the molded mass to the action of a large volume of heated air under such pressure as will prevent boiling or ebullition of water in the molded mass, until it has set, hardened, and substantially dried.

In testimony whereof I have hereunto subscribed my name this 15th day of November 1924.

WEBB T. IRVIN.